(12) United States Patent
Patil et al.

(10) Patent No.: US 6,489,976 B1
(45) Date of Patent: Dec. 3, 2002

(54) SYSTEM AND METHOD FOR DISPLAYING POP-UP SYMBOLS FOR INDICATING ACCELERATOR KEYS FOR IMPLEMENTING COMPUTER SOFTWARE OPTIONS

(75) Inventors: Rajesh Patil, Northborough; Jennifer H. Noble, Shrewsbury; Robert Shaver, Watertown, all of MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,493

(22) Filed: Dec. 6, 1999

Related U.S. Application Data

(60) Provisional application No. 60/112,202, filed on Dec. 15, 1998.

(51) Int. Cl.[7] .................................................. G09G 5/00
(52) U.S. Cl. ........................ 345/827; 345/779; 345/808
(58) Field of Search ................................. 345/827, 825, 345/779, 780, 762–763, 808, 809, 818, 772, 735, 739, 710, 711, 713, 853–854, 860, 744, 747; 707/3, 10, 11

(56) References Cited

U.S. PATENT DOCUMENTS

| | | | | |
|---|---|---|---|---|
| 4,914,732 A | * | 4/1990 | Henderson et al. ......... | 345/828 |
| 5,287,514 A | * | 2/1994 | Gram ........................... | 345/744 |
| 5,825,362 A | * | 10/1998 | Retter ........................... | 345/779 |
| 5,943,054 A | * | 8/1999 | Hirano et al. ................. | 345/827 |
| 5,969,718 A | * | 10/1999 | Mills et al. .................... | 345/827 |
| 6,094,197 A | * | 7/2000 | Buxton et al. ................ | 345/853 |
| 6,094,529 A | * | 7/2000 | Jeffries et al. ................ | 345/823 |
| 6,141,011 A | * | 10/2000 | Bodner et al. ................ | 345/827 |
| 6,236,987 B1 | * | 5/2001 | Horowitz et al. ............. | 707/3 |
| 6,313,851 B1 | * | 11/2001 | Matthews, III et al. ...... | 345/718 |
| 6,344,865 B1 | * | 2/2002 | Matthews, III et al. ...... | 345/815 |

* cited by examiner

*Primary Examiner*—Steven Sax
(74) *Attorney, Agent, or Firm*—Mintz Levin Cohn Ferris Glovsky and Popeo, P.C.

(57) ABSTRACT

A system, method, and computer readable medium containing computer readable instructions for displaying pop-up accelerator key symbols that indicate accelerator keys that may be activated by a user to select a user selectable portion in a graphical user interface to initiate an option corresponding to the user selectable portion. When a user holds down the "ALT" key, the pop-up display includes a letter, number or other symbol that, when depressed (alone or with the "ALT" key), functions to select an option. Pop-up symbols may also be provided for selecting a group of icons and presenting symbols for each group of icons when a user selects the group symbol corresponding to that group of icons.

16 Claims, 4 Drawing Sheets

SYSTEM AND METHOD FOR DISPLAYING POP-UP SYMBOLS FOR INDICATING ACCELERATOR KEYS FOR IMPLEMENTING COMPUTER SOFTWARE OPTIONS

RELATED APPLICATIONS

This application claims priority from provisional patent application No. 60/112,202 filed Dec. 15, 1998 entitled "System and Method for Displaying Pop-up Symbols For Indicating Accelerator Keys For Implementing Computer Software Options.

FIELD OF THE INVENTION

This invention relates to a system and method for displaying pop-up symbols to enable users to select accelerator keys associated with computer software options.

BACKGROUND OF THE INVENTION

Computer software applications continue to add more options that users may implement in that software application. With more options available to the user, it becomes increasingly difficult to devise ways to enable users to easily and efficiently implement these options. Some applications include pull-down menus that display various options and even sub-options. In these applications, for a user to select and implement an option, a user uses a mouse (or other input device) to select a menu heading (e.g., "File"), and then may select an option from the menu heading (e.g., "Save") and any sub-option (e.g., "Save as New Document" or "Save as New Version") within that option.

Existing systems also provide certain short-cuts to speed the selection of certain options without accessing pull-down menus. In at least some existing software applications, there are at least two types of short-cuts by which a user can select an option: (1) option icons that correspond to selectable options, and (2) accelerator keys.

Option icons are generally graphical "buttons" that represent an option For example, a common icon is a print icon. By selecting this icon, a document (or other item) may be printed. Option icons can also correspond to format options, file folders, tasks or a variety of other known options.

Accelerator keys are usually a combination of keys (e.g., ALT-P) that when simultaneously depressed, implement an option (e.g., printing). In some cases, a single key (e.g., F7) can be an accelerator key. In some applications, when the user clicks on a menu heading, a listing of selectable options, along with a keyboard combination shortcut (ALT-S) is shown to correspond to the selectable options. The user may then select that option by using the keyboard combination shown for that selectable option.

Option icons and accelerator keys provide certain advantages. However, there are also drawbacks associated with each. One drawback associated with option icons is that they require a user to manipulate a mouse (or other input device) to point to and click on the desired icon. This usually requires the user to remove at least one hand from the keyboard. Some users find that this decreases productivity.

Accelerator keys avoid the need for users to remove their hands from a keyboard. However, a user must typically memorize the accelerator key combination associated with each option or the user must check a user manual, on-line help, a pull-down menu, or other reference source to determine the key combinations for a particular option.

Another drawback with existing accelerator key systems is that the assignment of these key combinations is limited. Typically, each key combination is designated to represent a single option at a time. The user may change the assignment of the key combination to represent another option, but the key combination can not serve to simultaneously represent multiple options. For example, "ALT-F," may represent the "Open File Menu" option; or reassign "ALT-F" to correspond to a "FAX" option; but the keys "ALT-F" cannot operate both "Open File Menu" and "FAX."

Some existing systems arrange option icons in groups (e.g., tool bars). Further, in some systems, when a user points to an icon (e.g., by moving a cursor over the icon), an indicator is provided to identify the option to which the icon corresponds. This is sometimes known as "bubble help." A limitation associated with bubble help is that the user must typically move a mouse over the icon to activate bubble help for that particular icon. Thus, bubble help is provided for only one icon at a time. Another drawback is that the user must remove at least one hand from a keyboard to move a cursor over the icon.

Other drawbacks also exist with known systems.

SUMMARY OF THE INVENTION

One object of the invention is to overcome these and other drawbacks of known systems.

Another object of the present invention is to provide a system, method, and computer readable medium that enables a user to cause the computer to display pop-up accelerator key symbols associated with and next to option icons and that represent keys that may be selectable by the user through use of a keyboard or other input devices to implement the option with which the symbol is associated.

Another object of the invention is to provide a system, method, and computer readable medium that enables a user to select options by using accelerator keys without requiring memorization or requiring the user to manually check a reference guide.

Another object of the present invention is to provide a system, method, and computer readable medium that facilitates simultaneous display of multiple accelerator key symbols that correspond to two or more groups of selectable options.

Another object of the present invention is to provide a system, method, and computer readable medium for enabling display of multiple levels of accelerator key symbols.

Another object of the invention is to provide a system, method and computer readable medium that enables context-sensitive assignment of accelerator key combinations to enable the same key or key combination to represent different options in different contexts.

These and other objects of the invention are carried out according to various embodiments of the invention. One embodiment comprises a system, method, and computer readable medium containing computer readable instructions for displaying pop-up accelerator key symbols that indicate accelerator keys that may be activated by a user to select a user selectable portion in a graphical user interface (GUI) to initiate an option corresponding to the user selectable portion. For example, when a user holds down the "ALT" key, the pop-up display includes a letter, number or other symbol next to each icon in one or more icon groups. The letter, number or symbol corresponds to an input of an input device that, when depressed (alone or with the "ALT" key), functions to select the option the icon represents.

For example, assume a tool bar contains five icons, each corresponding to an icon in the GUI that corresponds to a computer software option. If a user depresses the ALT key, the display may pop-up a number (or other symbol) for each icon, wherein the number or other symbol corresponds to an accelerator key combination that may be used to select the option associated with that icon. For example, the numbers 1–5 may be assigned to the five icons, respectively. Thus, in this example, ALT-1 may cause the option associated with the first icon to be implemented, and so on.

According to another aspect of the invention, upon activation of a key, the display may simultaneously indicate symbols for a plurality of groups of icons. For example, a display may comprise a first tool bar and a second tool bar (or other group of icons). When the ALT key is selected, the system may display a symbol corresponding to the accelerator key for each icon of each group. One advantage of this aspect of the invention is that it does not require the user to use a mouse, memorize accelerator key combinations or manually look up accelerator key combinations to implement an option.

According to another embodiment, the display may indicate a first symbol for a first group of icons and a second symbol for second group of icons. The user may then select one of the symbols. In response, the system may display accelerator key symbols for each icon of the selected group. Multiple levels of groupings (more than two) may also be selected in this level.

Other features and advantages of the invention will be apparent to one of ordinary skill in the art from the detailed description and drawings set forth herein.

DETAILED DESCRIPTION OF THE PRESENT INVENTION

One embodiment of the present invention relates to a system, method and computer readable medium that enables a user to initiate the display of pop-up symbols near user-selectable portions (e.g., icons) in the workspace of a graphical user interface. The user-selectable portions initiate activation of a computer software option. The symbols provide indications of accelerator key combinations that may be selected by a user to activate the corresponding options.

Figure 1:
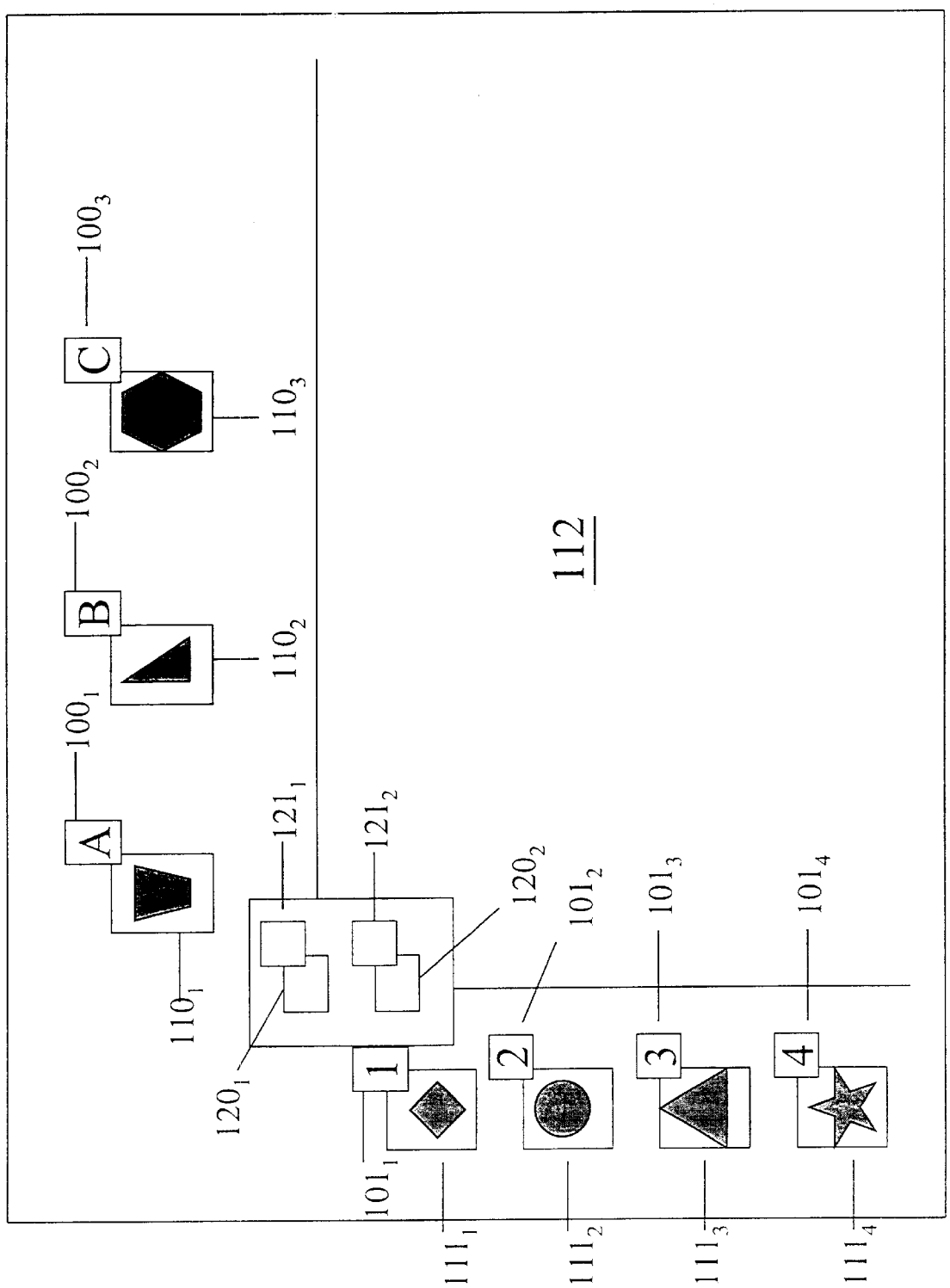
FIG. 1 schematically illustrates a portion of a computer display according to one embodiment of the present invention.

FIG. 1 schematically illustrates a portion of a computer display according to one embodiment of the invention. This portion may be referred to as the workspace which should generally be understood to describe the working space in the graphical user interface where icons and text editing portions are provided. The working space is generally understood not to include the drop-down menu bar. FIG. 1 depicts a first group of option icons ($110_1$–$110_3$) corresponding to a first group of options (e.g., a first tool bar) and a second group of option icons ($111_1$–$111_4$) corresponding to a second set of options (e.g., a second tool bar).

FIG. 1 further depicts a portion of the display allocated to a software application portion 112 (e.g., a word processing program, spreadsheet program, database access program, etc.). FIG. 1 further depicts simultaneously displayed pop-up symbols ($100_1$–$100_3$) associated with respective option icons ($110_1$–$110_3$) and pop-up symbols ($101_1$–$101_4$) associated with option icons $111_1$–$111_4$. The pop-up symbols provide an indication of accelerator keys to enable a user to select from among a plurality of options depicted by the option icons.

According to one aspect of the invention, the pop-up symbols are displayed when a user depresses a key of a keyboard (or other input device). For example, when a user depresses the ALT key, the pop-up symbols $100_1$–$100_3$ and $101_1$–$101_4$ are each displayed in juxtaposition to one of the icons $100_1$–$100_3$ and $101_1$–$101_4$, respectively. These pop-up symbols display to the user the key(s) that may be activated (alone or in conjunction with the ALT key, for example) to execute the option associated with the icon.

For example, if the user desires to implement the option depicted by icon $110_1$, the user sees the letter A ($100_1$) displayed in association with the icon $110_1$ upon depressing the ALT key. According to one embodiment, the user may then hold down the ALT key and A key simultaneously to implement option $110_1$. Also, as detailed below, after depressing the ALT key, the user may only depress the A key to select the option associated therewith. Thus, according to the present invention, a user may initiate simultaneous display of various accelerator keys for a plurality of options, including options depicted by icons in one or more groups.

As further depicted in FIG. 1, one or more sub-options (e.g., $120_1$ and $120_2$) may correspond to an option (e.g., option $111_1$). Another aspect of the invention provides pop-up symbols for the sub-options as indicated by $121_1$ and $121_2$. Additional levels of sub-options may also be provided according to the invention. The pop-up symbols for the sub-options ($121_1$ and $121_2$) may be simultaneously displayed with the symbols for other levels of options, or they may be displayed only if the option associated therewith (e.g., option $111_1$) is selected.

According to another aspect of the invention, the user may initiate the display of a pop-up indication of a symbol designating an accelerator key corresponding to each of a group of icons. For example, with reference to FIG. 2, if the user actuates a particular key (e.g., ALT), the display provides a pop-up indication of a symbol ($113_1$) associated with a first group of icons and a symbol ($113_2$) associated with a second group of icons. For example, the first group of icons may be a first tool bar and the second group of icons may be a Format options tool bar. By actuating an accelerator key associated with the first or second symbol, the display then selectively displays pop-up symbols for the options corresponding to the icons of whichever group the user selects.

For example, according to this embodiment, when the user depresses the ALT key, the letter "T" may appear in juxtaposition to a first group of option icons (e.g., a tool bar) and the letter "F" may appear in juxtaposition to a second group of icons (e.g., a collection of Format option icons). If a user depresses ALT-T, the system displays pop-up symbols for each of the icons of the tool bar. If a user depresses ALT-F, the system displays pop-up symbols for each of the icons of the Format options toolbar. Of course, the invention also works with more than two groups of icons. Further, the invention is not limited to tool bars. Without limitation, one or more of the groups of icons may be a collection of bookmarks, folders, Windows™ (trademark of Microsoft Corporation) operating system options, or other icons.

Figure 2:
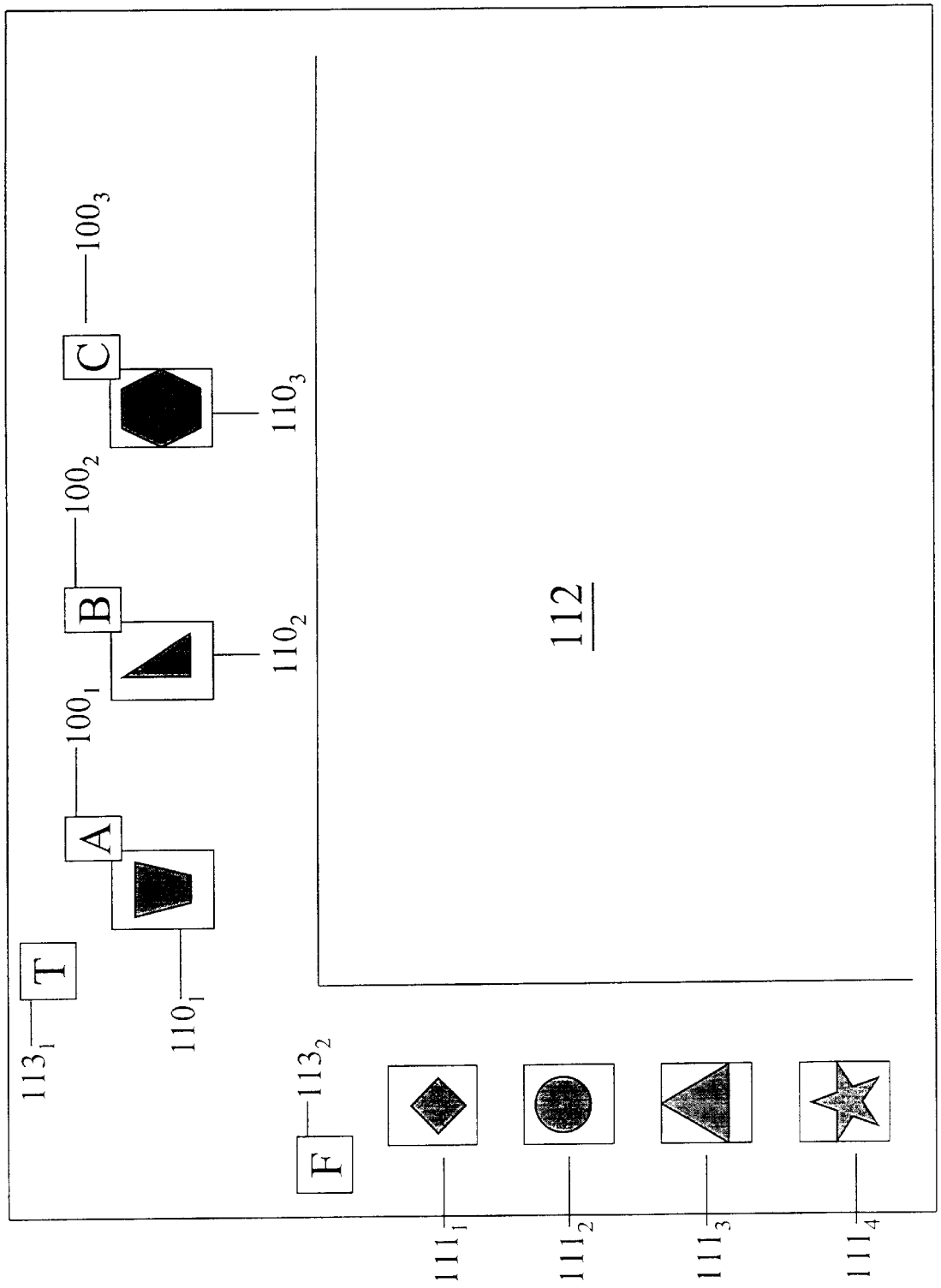
FIG. 2 schematically illustrates a portion of a computer display according to one embodiment of the present invention.

The software application schematically depicted in FIGS. 1–2, may be computer implemented using a stand alone computer device (e.g., PC, lap-top, hand-held computing device, etc.) or a networked computer or other device.

Figure 3:
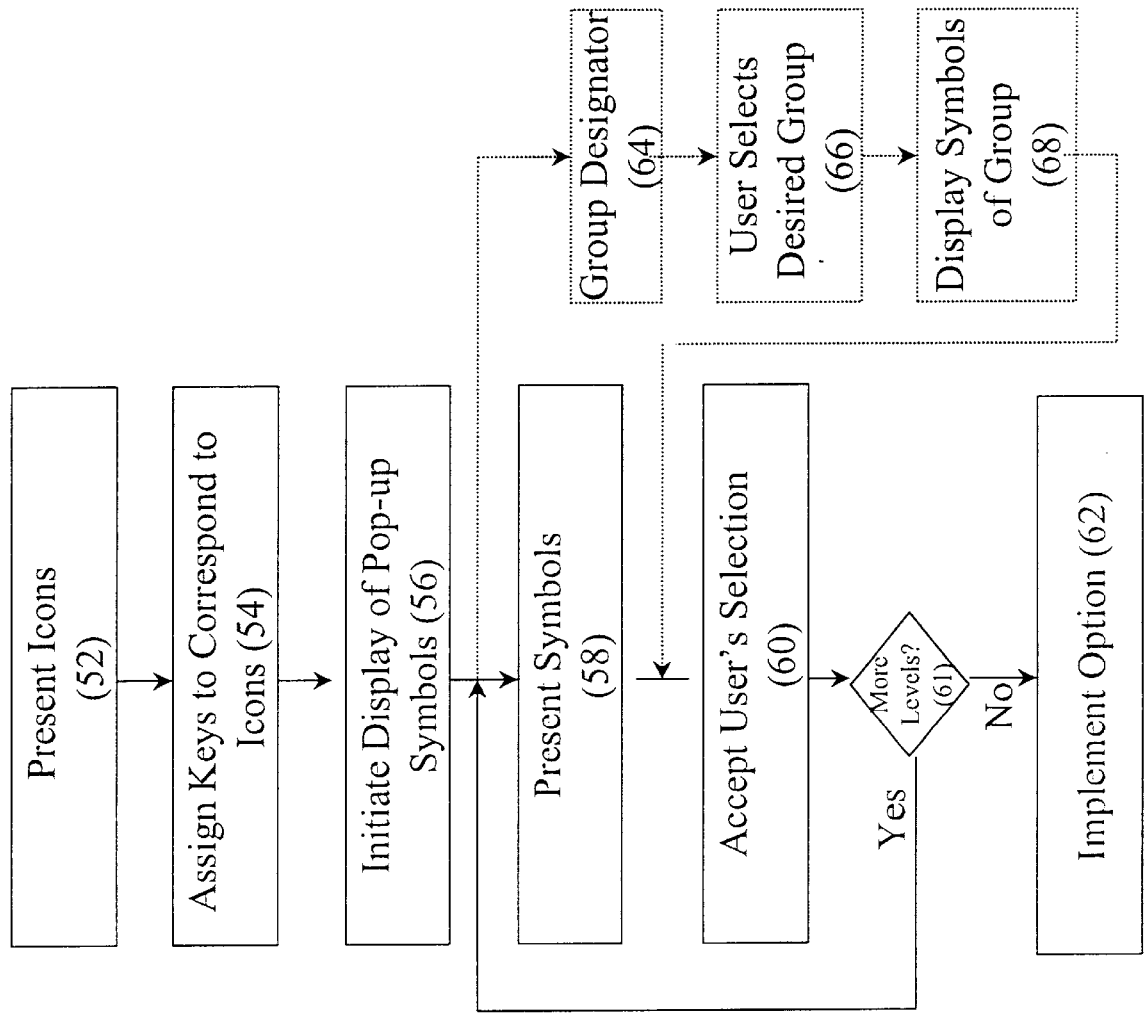
FIG. 3 depicts a flow diagram of a method according to one embodiment of the present invention.

FIG. 3 depicts a method of operation 50 according to one embodiment. In this embodiment, a software application comprises a display with a workspace that includes, among other things, one or more groups of option icons that are displayed (step 52) as for example, in FIGS. 1 and 2. As mentioned above, the presentation of option icons (e.g., tool bars) may be performed in a known manner. The system may then dynamically assign one or more accelerator keys to correspond to each option icon and thus, the option corresponding to the icon, as detailed below (step 54). Methods of adding accelerator keys to enable activation of that option upon selection of the accelerator key are known and will not be described.

In step 54, a correspondence table may be generated which contains accelerator keys assigned to at least one or more options or option icons, and/or at least one or more groups of option icons. According to one aspect of the invention, the assignments may be done dynamically as option icons or groups of icons change. This enables context-sensitive assignment of accelerator keys. For example, certain keys may be assigned in order across a toolbar or other collection of icons. The system may alphabetically assign the symbols A, B, C, D, etc. for a horizontal toolbar and 1, 2, 3, 4, etc. for a vertical bar or collection of icons. These keys may then be assigned to whatever icons are presented in those groups in the order of presentation and may be changed as the order and content of icons change.

When desired, a user initiates display of accelerator key pop-up symbols through some initiation activity (e.g., depressing the ALT key). The user may initiate the pop-up symbol display (step 56) by use of keys of a keyboard, or in other ways, for example, by activation of a computer mouse, touch screen interface, voice response system, or other suitable input device.

In response to step 56, the system presents pop-up symbols next to one or more icons (step 58). The pop-up accelerator key symbols may comprise one or more letters, words, numbers, symbols or graphical images which correspond to inputs on an input device that are capable of being selected, such as keys on a keyboard or other input devices. The accelerator key shortcut symbols may also be presented to the user by way of an image display shown on the computer screen, by voice response or other output device. The user then may select an option (step 60) by activating an input or accelerator key corresponding to a symbol displayed in the pop-up portion associated with an option icon for that option. The user may select the desired option by way of keyboard selection, voice response or other input device.

As illustrated by the dotted lines in FIG. 3, another embodiment of the invention may work as follows. When the user initiates display of the pop-up symbols (step 56), one or more group designators (e.g., 113$_1$ or 113$_2$) may be displayed (step 64). When the user selects one of the groups by actuating a key corresponding to the symbol associated with the desired group (step 66), the system displays pop-up symbols for the icon options in the selected group (step 68) and the user may then select an option as described above (step 60). In step 61, the system determines if the selected option has more levels, e.g., sub-options. If so, control returns to step 58 or 64. If not, the system implements the option (step 62).

Preferably, the pop-up symbols feature of the invention may be implemented as one or more modules in an overall software application, or one or more modules that work in conjunction with a software application.

Figure 4:
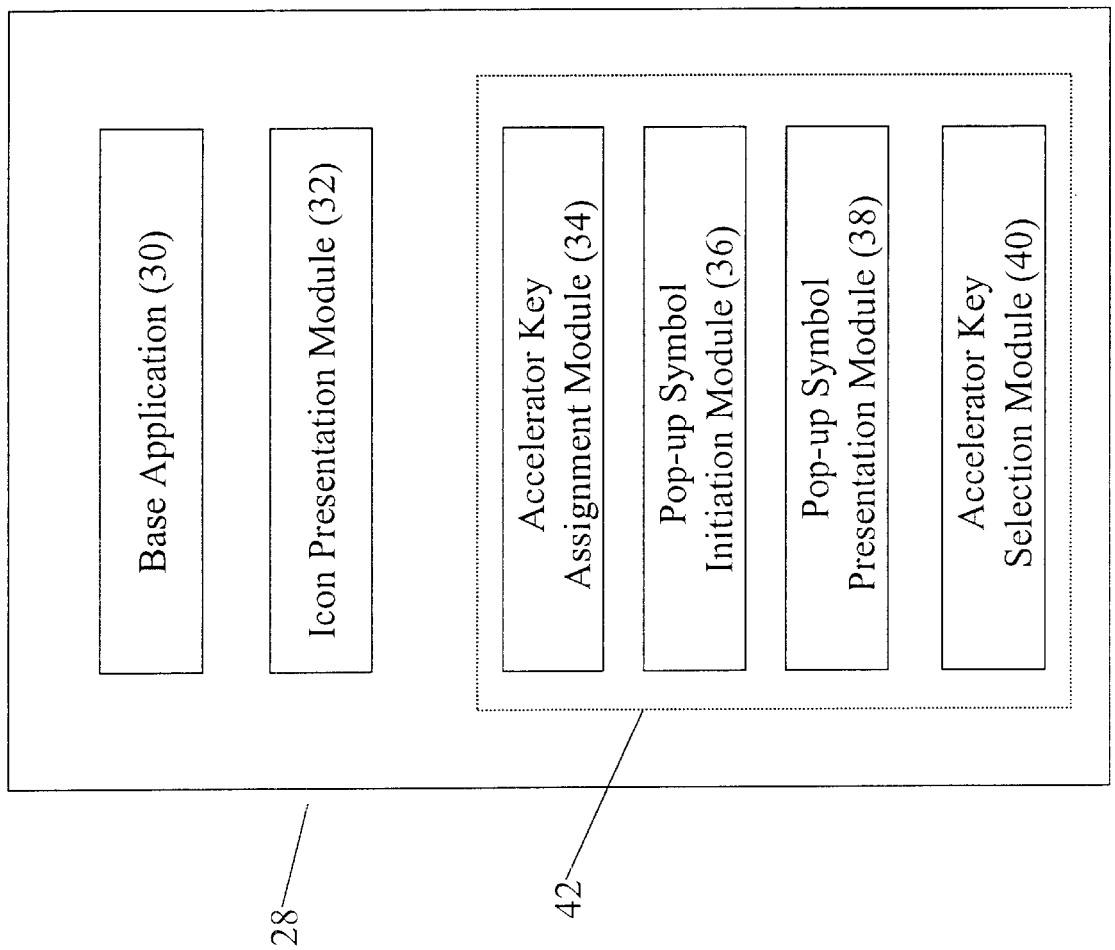
FIG. 4 depicts a schematic block diagram representation of a computer implemented software module according to an embodiment of the present invention.

FIG. 4 schematically depicts an embodiment of a software application module 28 storable on a computer readable medium according to the present invention that may be operable to cause a computer to perform the functionality described herein. Of course, only selected modules may be stored on a computer readable medium and others may be stored elsewhere.

Application module 28 comprises a base application module 30, an icon presentation module 32, an accelerator key assignment module 34, a pop-up symbol initiation module 36, a pop-up symbol presentation module 38, and an accelerator key selection module 40.

According to one embodiment of the present invention, base application module 30 may comprise one or more computer software applications. For example, base application module 30 may comprise a data processing application, a spreadsheet application, an electronic mail message forwarding and receiving application, an internet browser application, an electronic database search application, an electronic selection application or other applications. One example of an application is a software product offered by Lotus Development Corporation known as Lotus Notes.™

Icon presentation module 32 presents options to the user by way of a graphical user interface or other output device, such as through option icons on the display of a computer system and may comprise part of base application module 30. The options may be selected from one or more options associated with base application 30 or other software usable therewith. Presentation modules per se are known. Examples include tool bars, file folders, collections of bookmarks, etc. The icon options may comprise a graphical representation of at least one or more options, one or more groups of options, multiple levels of options or groups of options or other arrangements of options.

An accelerator key assignment module 34 may be provided to assign keys to various option icons and/or options. These assignments may be implemented and stored, for example, in a table. A pop-up symbol initiation module 36 may receive a command from the user to initiate display of accelerator key symbols for one or more option icons or groups of option icons. A pop-up symbol presentation module 38 may be responsive to pop-up symbol initiation module 36 to display pop-up accelerator key symbols in association with option icons. Upon user selection of an accelerator key symbol via keyboard entry or other input device, accelerator key selection module 40 receives the user's selection and cooperates with base application 30 or another application or module to cause the selected option to be implemented.

It should be understood that although multiple modules are described as being part of application module 28 such modules may also be independent of application module 28. The function performed by several different modules as described herein may be performed by a single module within an application. The functions described as being performed by a module may also be performed by multiple modules.

From a user's viewpoint, the pop-up accelerator key symbol feature may enable a user to select options solely via a single input device such as a keyboard selection or other input device. To activate the accelerator key selection module 40, the user enters an initiation command (e.g., the ALT key). Then, a pop-up window appears on the graphical user interface displaying pop-up accelerator key symbols. When the user actuates a key on the keyboard or other input device, the system implements the selected option.

Accelerator key symbols may be assigned to any computer selectable option or portion thereof. Examples of options include, but are not limited to, access, open or display features, execute, run, or perform tasks of programs, and subroutines, modules, databases or other options.

The pop-up symbols may be one or more symbols, numbers, letters, words, images or other indicators. Groups of options such as a menu bar, task bar, action bar, tool bar or other types of groups may be represented by one or more accelerator key symbols.

According to one embodiment of the present invention, pop-up symbol initiation module 36 may receive an initiation command from the user to initiate display of the symbols. The initiation command may be given by the user by activation of a key or other input device (e.g., computer mouse, touch screen interface, voice response system, or other input). The activation command may instruct the system to display one or symbols, certain symbols, or multiple levels of symbols According to one embodiment of the present invention, pop-up symbol presentation module 38 displays symbols corresponding to icon options that are available. The symbols displayed may comprise letters, numbers or other symbols corresponding to keys of a keyboard or other input devices that represent accelerator keys. Symbols may be displayed for each icon or for a group of icons as discussed further herein. The symbol may be displayed in juxtaposition to the icon or group of icons to which it corresponds. For example, the symbols may be displayed above, below, next to, over or under (at least partially) the associated icon option. Other presentation schemes may also be used.

Accelerator key selection module 40 may accept the user's selection of options via entry of a key on the keyboard. If the user selects the desired option by keyboard entry, the user merely depresses the key(s) on the keyboard which correspond to the symbols displayed in association with the particular options icon. Upon selection of the desired option, the system (e.g., base application) may implement the option associated with the selected icon.

For illustration purposes only, an example of one embodiment of the present invention is provided. Assume a software application enables a user to read mail, view a calendar, view a to-do list, read headlines, view contacts, create new e-mails, and access other databases (among other things). A tool bar may be displayed with icons representing each of these options. The system assigns to each option an accelerator key (e.g., 1, 2, 3, 4, 5, 6, 7, respectively). If the user wishes to access the "create new e-mails" option, the user initiates the display of the accelerator key symbols by depressing the ALT key. The system then displays the accelerator key symbol in association with its corresponding option (e.g., at a corner of each icon). Then, the user selects via keyboard entry number 6 (the accelerator key symbol that corresponds to the "create new e-mails" option). Selection of number 6 on the keyboard enables the user to select the "create new e-mail" option. The system then initiates creation of a new e-mail so that the user may then perform any permitted function associated with this option.

According to one specific embodiment, the invention may be implemented in the manner described in connection with the Popup Keyboard Access™ feature of the software program licensed by Lotus Development Corporation under the name Lotus Notes™. According to one embodiment, Popup Keyboard Access™ and Lotus Notes™ may be operating on a Windows™ operating system. Popup Keyboard Access™ may display accelerator key symbols in the program's tool bar(s), task bar(s), action bar(s) or menu bar(s) or other icon groups in the Windows™ operating system. Other operating systems may also be used. The invention is also applicable to web browsers.

The pop-up accelerator key symbols may provide the user with accelerator key shortcut symbols that represent all available options, certain types of options, groups of options, multiple levels of options or other presentation schemes.

Other embodiments and uses of the present invention will be apparent to those skilled in the art from consideration of the specification and practice of the invention disclosed herein. The specification and examples should be to considered exemplary only. The intended scope of the invention is only limited by the claims appended hereto.

What is claimed is:

1. A system for selecting software options comprising:

a selectable portion presentation module that presents one or more selectable portions in the workspace of a graphical user interface, each selectable portion initiating a software option when selected;

an initiation module that receives an initiation request from the user;

said request comprising an initiation command from the user from a device input selected from the group consisting of a computer keyboard key, a computer mouse click, a computer pen touch, a voice response input, and a touch screen interface input;

an option symbol presentation module for indicating accelerator functionality, that presents one or more symbols associated with one or more of the selectable portions in the workspace of the graphical user interface in response to the initiation request from the user, each symbol representing an input of an input device that may be used by a user to select the user selectable portion in response to the initiation request from the user; and an option selection module that receives a selection by the user of an input and initiating performance of the option corresponding to that input.

2. The system of claim 1 wherein the option symbol presentation module presents a plurality of symbols wherein at least one of the symbols may be selected to present symbols associated with one or more selectable portions.

3. The system of claim 1 wherein the option symbol presentation module presents one or more group symbols representing one or more groups of icons, wherein the group symbols may be selected to display one or more symbols associated with the group of options corresponding to the group symbol.

4. The system of claim 1 wherein the option selection module receives a symbol selection from the user from a device input selected from the group consisting essentially of a computer keyboard key, a computer mouse click, a computer pen touch, a voice response input, and a touch screen interface input.

5. The system of claim 1 further comprising an assignment module for dynamically assigning symbols presented to the user with selectable portions.

6. The system of claim 5 wherein the dynamic assignment is based on relative positioning of the selectable portions within the workspace.

7. A system for selecting options comprising:

selectable portion presentation means for presenting one or more to selectable portions in the workspace of a graphical user interface, each selectable portion initiating a software option when selected;

initiation means for enabling a user to initiate presentation of one or more symbols associated with the selectable portions;

said means receiving an initiation command from the user from a device input selected from the group consisting of a computer keyboard key, a computer mouse click, a computer pen touch, a voice response input, and a touch screen interface input;

option symbol presentation means for indicating accelerator functionality, for presenting one or more symbols associated with one or more of the selectable portions in the workspace of the graphical user interface in response to the initiation means, each symbol representing an input of an input device that may be used by a user to select the user selectable portion with which it is associated; and option selection means for receiving from the user at least one selection of an input and initiating performance of an option corresponding to that input.

8. The system of claim 7 wherein the option symbol presentation means comprises means for presenting multiple levels of keyboard selections associated with one or more options.

9. The system of claim 7 further comprising means for dynamically assigning symbols to be associated with selectable portions based on the positioning of the selectable portions in the workspace.

10. The system of claim 7 wherein the option symbol presentation means comprises means for presenting a symbol that may be selected to display one or more symbols associated with a group of options.

11. The system of claim 10 wherein the means for presenting presents multiple levels of symbols associated with multiple levels of groups.

12. A method for selecting options comprising the steps of:

presenting one or more selectable portions in the workspace of a graphical user interface each selectable portion initiating a software option when selected by the user;

receiving an initiation request from a user;

said request comprising an initiation command from the user from a device input selected from the group consisting of a computer keyboard key, a computer mouse click, a computer pen touch, a voice response input, and a touch screen interface input;

presenting symbols, for indicating accelerator functionality, associated with one or more of the selectable portions in the workspace of the graphical user interface, each symbol representing an input of an input device that may be used by a user to select the user selectable portion;

receiving at least one or more symbol selections from a user; and initiating the software option corresponding to the symbol selected.

13. The method of claim 1 wherein the step of presenting symbols comprises the step of:

a) assigning a symbol to correspond to each selectable portion in a group of selectable portions; and b) receiving a command to initiate presentation of the symbol assignments for that group of selectable portions.

14. A computer usable medium having computer readable program code means for selecting an option of a computer software program comprising:

computer readable program code means for causing a computer to present one or more selectable portions in the workspace of a graphical user interface, each selectable portion initiating a software option when selected;

computer readable program code means for causing the computer to receive an initiation request from a user;

said request comprising an initiation command from the user from a device input selected from the group consisting of a computer keyboard key, a computer mouse click, a computer pen touch, a voice response input, and a touch screen interface input;

computer readable program code means for causing a computer to present symbols for indicating accelerator functionality, associated with one or more of the selectable portions in the workspace of the graphical user interface, each symbol representing an input of an input device that may be used by a user to select the user selectable portion; and computer readable program code means for causing a computer to receive at least one or more selections of symbols and initiate the software option corresponding to the symbol selected.

15. The computer usable medium of claim 1 wherein the computer readable program code means for causing a computer to present one or more selectable portions comprises computer readable program code means for causing a computer to dynamically assign symbols to be associated with selectable portions.

16. The computer usable medium of claim 1 wherein the computer readable program code means to dynamically assign symbols dynamically assigns symbols based on the position of the selectable portions in the workspace.

* * * * *